(12) United States Patent
Stark et al.

(10) Patent No.: US 6,870,009 B2
(45) Date of Patent: Mar. 22, 2005

(54) POLYVINYL ACETALS WITH IMPROVED ADHESION

(75) Inventors: Kurt Stark, Burgkirchen (DE); Bernhard Glaser, Wörth (DE); Werner Bauer, Winhöring (DE); Peter Tschirner, Emmerting (DE)

(73) Assignee: Wacker Polmer Systems GmbH & Co. KG, Burghausen (DE)

( * ) Notice: Subject to any disclaimer, the term of this patent is extended or adjusted under 35 U.S.C. 154(b) by 41 days.

(21) Appl. No.: 10/218,135

(22) Filed: Aug. 13, 2002

(65) Prior Publication Data

US 2003/0040575 A1 Feb. 27, 2003

(30) Foreign Application Priority Data

Aug. 16, 2001 (DE) .......................... 101 40 130

(51) Int. Cl.$^7$ ................................. C08K 5/07
(52) U.S. Cl. .................. 525/162; 525/330.3; 525/330.6
(58) Field of Search .............................. 525/162, 330.3, 525/330.6

(56) References Cited

U.S. PATENT DOCUMENTS

| | | | |
|---|---|---|---|
| 3,379,703 | A | 4/1968 | Ehmann et al. |
| 4,663,228 | A | 5/1987 | Bolton et al. |
| 5,118,751 | A | 6/1992 | Schulze et al. |
| 5,367,015 | A | 11/1994 | Gutweiler et al. |
| 5,559,175 | A * | 9/1996 | Kroggel et al. ............ 524/297 |
| 5,567,750 | A | 10/1996 | Schulze et al. |
| 6,211,289 | B1 | 4/2001 | Tschirner et al. |

FOREIGN PATENT DOCUMENTS

| | | |
|---|---|---|
| BE | 657268 | 6/1965 |
| CA | 1 161 195 | 1/1984 |
| DE | 747 879 | 10/1944 |
| DE | 813 458 | 9/1951 |
| DE | 196 41 064 A1 | 4/1998 |
| EP | 0 032 724 A2 | 7/1981 |
| EP | 0 368 832 A2 | 5/1990 |
| EP | 0 461 399 A2 | 12/1991 |
| EP | 0 535 643 A1 | 4/1993 |
| EP | 0 594 026 A2 | 4/1994 |
| EP | 0 634 447 A1 | 1/1995 |
| EP | 0 346 768 B1 | 9/1995 |
| EP | 1 055 686 A1 | 11/2000 |
| EP | 0 636 471 B1 | 3/2001 |

OTHER PUBLICATIONS

Abstract Corresponding To EP 319 614 [1989].
Abstract Corresponding To EP 319 613 [1989].
Abstract Corresponding To JP 63046279 [1988].
Abstract Corresponding To CH 271 648 [1952].
Abstract Corresponding To JP 09110930 [1997].
Derwent Abstract Corresponding To EP 634 447 [AN 1995–045145].
Derwent Abstract Corresponding To EP 1 055 686 [AN 2000–482991].
Derwent Abstract Corresponding To DE 196 41 064 [AN 1998–218181].
E. Plueddemann, "Bonding Through Coupling Agents," Plenum Press, New York, 1985.

* cited by examiner

Primary Examiner—William K. Cheung
(74) Attorney, Agent, or Firm—Brooks Kushman P.C.

(57) ABSTRACT

Low molecular weight polyvinyl acetals have a solution viscosity of from 2 to 12 mPas and a degree of polymerization $P_w$ less than 200, and are obtained by hydrolyzing a vinyl ester polymer having a solution viscosity of from 1.0 to 1.6 mPas until the content of vinyl alcohol units is $\geq 50$ mol %, to produce a polyvinyl alcohol whose solution viscosity is from 1.0 to 2.0 mPas, and then acetalizing the resultant polyvinyl alcohol. The products may be used as binders and films of increased adhesion to substrates.

20 Claims, No Drawings

POLYVINYL ACETALS WITH IMPROVED ADHESION

BACKGROUND OF THE INVENTION

1. Field of the Invention

The invention relates to low molecular weight polyvinyl acetals with improved adhesion, a process for their preparation, and also their use.

2. Background Art

The preparation of polyvinyl acetals, which are obtained from the corresponding polyvinyl alcohols by polymer-analogous reaction with the appropriate aldehydes, have disclosed as early as 1924, and since then a wide variety of aldehydes has been used for preparing the corresponding polyvinyl acetals. Polyvinyl acetals are prepared in a 3-stage process wherein a polyvinyl acetate polymer is first prepared, hydrolyzed to a polyvinyl alcohol polymer, and subsequently acetalized. The resultant products contain vinyl alcohol units and vinyl acetate units as well as vinyl acetal groups. Polyvinyl formal, polyvinyl acetacetal, and polyvinyl butyral (PVB) have achieved particular commercial importance. The term "modified polyvinyl acetals" hereinafter refers to polyvinyl acetals which contain other monomer units as well as vinyl acetate, vinyl alcohol, and vinyl acetal units.

The largest application sector for polyvinyl acetals is the production of safety glass in automotive construction and for architectural uses, where plasticized polyvinyl butyral films are used as an intermediate layer in glazing units. Mixtures containing modified polyvinyl butyral have also been proposed for this purpose, for example those having the acetal units described in EP-A 368832 with sulfonate, carboxylate, or phosphate functionality, which feature improved blocking performance and flow performance. EP-A 634447 discloses modified polyvinyl butyrals whose main polymer chain contains monomer units which bear sulfonate groups, these polyvinyl butyrals being obtainable via acetalization of polyvinyl alcohols which have sulfonate functionality.

EP-A 461399 discloses polyvinyl butyrals modified with amino groups, used as precipitants. Another application sector for polyvinyl butyrals is their use in anti-corrosion coatings, as disclosed by EP-A 1055686, for example, where use is made of polyvinyl acetals modified with tertiary alkanolamines.

Polyvinyl butyrals are also used as binders in paints, and specifically as binders in printing inks, their success in these applications being due to their good pigment binding power. A requirement of printing ink applications is a very low solution viscosity of the organic solutions of the polyvinyl butyrals, in order to permit formulation of inks with high solids content, using a very high binder content. Examples include the modified polyvinyl butyrals disclosed in DE-A 19641064, obtained by acetalizing a copolymer having vinyl alcohol units and 1-alkylvinyl alcohol units.

A disadvantage possessed by all of the polyvinyl acetals described in the prior art is their inadequate adhesion to specific substrates. For this reason, addition of coupling agents is essential in many cases. EP-B 0346768 describes the coating of films or foils with amino-functional silanes, such as N-(2-aminoethyl)-3-aminopropyltrimethoxysilane, in order to improve bonding to other polymers, in particular to polyvinyl butyrals. In the case of polyethylene films and polyester films, these are coated either with vinyltrimethoxysilanes or with chloropropyltrimethoxysilanes in order to improve adhesion, providing successful lamination using hot-melt adhesives based on ethylene-vinyl acetate copolymer (E. Plueddemann, "Bonding through Coupling Agents", Plenum Press, New York, 1985). Use is also made of N-(2-aminoethyl)-3-aminopropyltrimethoxysilane as a primer coat for improving the adhesion of an ionic resin, i.e. a salt of a polymer based on ethylene-methacrylic acid, to glass or polycarbonate films (U.S. Pat. No. 4,663,228). EP-B 0636471 claims a process for producing a glass composite, where the adhesion between glass and polymer film, i.e. polyvinyl butyral, is improved using a mixture of two or more silanes.

The processes described in the prior art for improving adhesion between polyvinyl acetals and critical substrates by adding known coupling agents have clear disadvantages. For example, the adhesion-promoting action is often not sufficiently long lasting, or the composite weakens over time. Another disadvantage is the yellowing of aminosilanes and their unpleasant odor and skin-irritant action, a known problem when using amino-functional compounds. Another problem is the addition of the coupling agent per se. This process always requires an additional, time-consuming step in the mixing procedure. The selection and addition of suitable coupling agents, furthermore, requires great expertise, since when the adhesion promoter is added to a polyvinyl acetal, for example in an organic solvent, the result can be incompatibility and inhomogeneity, leading to phase separation. In addition, the reactive silanes subsequently added as coupling agent may become involved in side reactions, for example hydrolysis or condensation reactions. Another disadvantage consists in the large amount of adhesion promoter which ordinarily must be added in order to achieve noticeably better adhesion of polyvinyl acetals on critical substrates. As a result, the process can become very expensive, since the price of silanes is high.

SUMMARY OF THE INVENTION

It was an object of the present invention to provide polyvinyl acetals which intrinsically exhibit improved adhesion to various substrates and in particular to the known critical substrates, making it virtually or completely unnecessary to add any coupling agent. Surprisingly, it has been found that low molecular weight polyvinyl acetals which are prepared by hydrolysis and/or transesterification of low-viscosity vinyl ester resins and subsequent acetalization of the low-viscosity polyvinyl alcohol products, have markedly better adhesion to critical substrates, to the extent that it can indeed be possible to omit the use of coupling agent. Adhesion to metal and to glass is also greatly improved.

DETAILED DESCRIPTION OF THE PREFERRED EMBODIMENTS

The invention provides low molecular weight polyvinyl acetals with solution viscosity of from 2 to 12 mPas (DIN 53015, Höppler method; 10% by weight solution in ethanol) and with a degree of polymerization $P_w$ less than 200, obtainable by hydrolyzing a vinyl ester polymer and subsequent acetalization of the resultant polyvinyl alcohol using one or more aliphatic and/or aromatic aldehydes having from 1 to 15 carbon atoms, wherein a vinyl ester polymer prepared from vinyl esters of optionally branched alkylcarboxylic acids having from 1 to 15 carbon atoms, and optionally one or more co-monomers, preferably selected from the group consisting of ethylenically unsaturated mono- and dicarboxylic acids, ethylenically unsaturated carboxamides and carbonitriles, monoesters of fumaric acid or maleic acid, ethylenically unsaturated sulfonic acids and salts of each of these, and having a solution viscosity of from 1.0 to 1.6 mPas (DIN 53015, Höppler method; 10% by weight solution in ethyl acetate) is hydrolyzed. The hydrolysis progresses until the content of vinyl alcohol units is greater than or equal to 50 mol %, and the resulting polyvinyl alcohol has a solution viscosity from 1.0 to 2.0 mPas (DIN 53015, Höppler method; 4% by weight solution in water).

Suitable vinyl esters are vinyl esters of unbranched or branched carboxylic acids having from 1 to 15 carbon atoms. Preferred vinyl esters are vinyl acetate, vinyl propionate, vinyl butyrate, vinyl 2-ethylhexanoate, vinyl laurate, vinyl pivalate and vinyl esters of α-branched monocarboxylic acids having from 5 to 11 carbon atoms, such as VeoVa9$^R$ or VeoVa10$^R$ (trade names of Shell). Vinyl acetate is preferred. From 50 to 99.98% by weight of vinyl ester, based on the total weight of the comonomers, is preferably copolymerized.

The vinyl ester polymers may optionally contain one or more comonomers, for example methacrylates and acrylates of alcohols having from 1 to 15 carbon atoms, olefins, dienes, vinylaromatics, and vinyl halides. The proportion of these optional comonomers is such that the proportion of vinyl ester in the copolymer is greater than or equal to 50 mol %. Preferred (meth)acrylates are methyl acrylate, methyl methacrylate, ethyl acrylate, ethyl methacrylate, propyl acrylate, propyl methacrylate, n-butyl acrylate, isobutyl acrylate, tert-butyl acrylate, n-butyl methacrylate, isobutyl methacrylate, tert-butyl methacrylate, 2-ethylhexyl acrylate, norbornyl acrylate. Particular preference is given to methyl acrylate, methyl methacrylate, n-butyl acrylate, isobutyl acrylate, tert-butyl acrylate, 2-ethylhexyl acrylate, and norbornyl acrylate. Suitable dienes are 1,3-butadiene and isoprene. Examples of polymerizable olefins are ethene and propene. Vinylaromatic comonomers which may be used are styrene and vinyltoluene. With respect to vinyl halides, vinyl chloride, vinylidene chloride, or vinyl fluoride are preferably used, more preferably vinyl chloride.

In a preferred embodiment, the vinyl ester polymers also contain from 0.02 to 20% by weight, based on the total weight of the vinyl ester polymer, of one or more comonomers including ethylenically unsaturated mono- or dicarboxylic acids, ethylenically unsaturated carboxamides and carbonitriles, and monoesters of fumaric acid and maleic acid. Preference is given to acrylic acid, methacrylic acid, fumaric acid, maleic acid, N-vinylformamide, acrylamide, acrylonitrile, maleic anhydride, vinylsulfonic acid, and 2-acrylamido-2-methylpropanesulfonic acid, and their salts.

Where appropriate, auxiliary monomers may be present, their proportion being from 0.02 to 20% by weight, based on the total weight of vinyl ester polymer. Examples of these are precrosslinking monomers such as comonomers with ethylenic polyunsaturation, e.g. divinyl adipate, diallyl maleate, allyl methacrylate, butanediol diacrylate, or triallyl cyanurate, and post-crosslinking comonomers, such as acrylamidoglycolic acid (AGA), methyl methacrylamidoglycolate (MAGME), N-methylolacrylamide (NMA), N-methylolmethacrylamide, allyl N-methylolcarbamate, alkyl ethers and esters of N-methylolacrylamide, of N-methylolmethacrylamide or of allyl N-methylolcarbamate, such as their isobutoxy ethers.

Particular preference is given to vinyl ester polymers having from 50 to 99.98% by weight of vinyl ester units, in particular vinyl acetate, and from 0.02 to 20% by weight of comonomer units which are ethylenically unsaturated mono- or dicarboxylic acids, based in each case on the total weight of the polymer. Particular preference is given to polymers having a solution viscosity of from 1.0 to 1.4 mPas (DIN 53015, Höppler method, in ethyl acetate at 20° C.) for the vinyl ester polymers.

The vinyl ester polymers may be prepared in a known manner by polymerization, preferably by bulk polymerization, suspension polymerization, or polymerization in organic solvents, more preferably in alcoholic solution. Examples of suitable solvents and regulators are methanol, ethanol, propanol, and isopropanol. The polymerization is carried out at reflux at a temperature of from 50 to 100° C., and is initiated by adding a free-radical initiators such as those conventionally used, for example, percarbonates such as cyclohexyl peroxydicarbonate, and peresters such as tert-butyl perneodecanoate or tert-butyl perpivalate. The molecular weight may be adjusted in a known manner via addition of a regulator (chain transfer agent), via the solvent content, by variation of the initiator concentration, and by variation of the temperature. Once the polymerization has ended, the solvent is distilled off, as are, where appropriate, excess monomer and regulator.

The vinyl ester polymers are hydrolyzed in a manner known per se, for example by the belt process or the kneader process, in an alkaline or acidic medium, with addition of acid or base. It is preferable for the solid vinyl ester polymer to be taken up in alcohol, e.g. methanol, the solids content being adjusted to 15–70% by weight. The hydrolysis is preferably carried out in a basic medium, for example by adding NaOH, KOH, or NaOCH$_3$. The amount of base used is generally from 1 to 5 mol % per mole of ester units. The hydrolysis is preferably carried out at temperatures of from 30 to 70° C. Once the hydrolysis has ended, the solvent is distilled off and the polyvinyl alcohol is obtained as a powder. However, it is also possible for the polyvinyl alcohol to be obtained as an aqueous solution by successive addition of water during removal of the solvent by distillation.

The partially or fully hydrolyzed vinyl ester polymers obtained in this way have a degree of hydrolysis of ≧50 mol %. For the partially hydrolyzed polyvinyl alcohols, the degree of hydrolysis preferably ranges from 70 to 90 mol %. Fully hydrolyzed vinyl alcohols having a degree of hydrolysis of ≧96 mol % are particularly preferred. The viscosity of the polyvinyl alcohol (DIN 53015, Höppler method; 4% by weight solution in water) is from 1.0 to 2.0 mPas, preferably from 1.0 to 1.8 mPas, and is a measure of the molecular weight or of the degree of polymerization of the partially hydrolyzed or fully hydrolyzed vinyl ester polymers. The degree of polymerization $P_w$ of the vinyl ester polymer or polyvinyl alcohol used, determined from the weight-average molecular weight $M_w$, is not greater than 200, preferably less than 175, and more preferably less than 150. The degree of polymerization $P_w$ is determined conventionally from $M_w$ by light scattering on a 0.5% by weight aqueous polyvinyl alcohol solution by using a Zimm plot for evaluation.

For the acetalization, the partially or fully hydrolyzed polyvinyl acetates are preferably taken up in an aqueous medium. The solids content of the aqueous solution is usually adjusted to 5–30% by weight. The acetalization preferably takes place in the presence of acidic catalysts such as hydrochloric acid, sulfuric acid, nitric acid, or phosphoric acid. The pH of the solution is preferably adjusted to values less than 1 by adding 20% by weight hydrochloric acid. After addition of the catalyst, the solution is cooled, preferably to −10 to +5° C. The acetalization reaction is initiated by adding the aldehyde component.

Preferred $C_{1-15}$ aliphatic aldehydes are formaldehyde, acetaldehyde, propionaldehyde, and most preferably, butyraldehyde, or a mixture of butyraldehyde and acetaldehyde. Examples of aromatic aldehydes which may be used are benzaldehyde and its derivatives. The amount of aldehyde added depends on the desired degree of acetalization. Since the acetalization proceeds to almost complete conversion, the amount required may be determined by simple stoichiometric calculation. After addition of the aldehyde has ended, the acetalization is completed by heating the mixture to 20–60° C. and stirring for a number of hours, preferably from 1 to 6 hours, and the pulverulent reaction product is isolated by filtration and washed. Further alkali may be added for stabilization. During the precipitation and the post-treatment emulsifiers may be added to stabilize the aqueous suspension of the polyvinyl acetal.

In order to stabilize the aqueous suspension of the polyvinyl acetal, anionic, zwitterionic, cationic, or non-ionic emulsifiers, or protective colloids may be used. It is preferable to use zwitterionic or anionic emulsifiers, and optionally mixtures thereof. Preferred non-ionic emulsifiers include condensation products of ethylene oxide (EO) and/or propylene oxide (PO) with linear or branched alcohols having from 8 to 18 carbon atoms or with alkylphenols, or with linear or branched carboxylic acids having from 8 to 18 carbon atoms. Block copolymers of ethylene oxide and propylene oxide may also be used. Examples of suitable anionic emulsifiers include alkyl sulfates, alkylsulfonates, alkyl aryl sulfates, and sulfates or phosphates of condensation products of ethylene oxide with linear or branched alkyl alcohols or with alkylphenols with from 2 to 25 EO units, and mono- or diesters of sulfosuccinic acid. Examples of suitable zwitterionic emulsifiers include alkyldimethylamine oxides, the alkyl group having from 6 to 16 carbon atoms. Examples of cationic emulsifiers which may be used include tetraalkylammonium halides such as $C_6$–$C_{16}$-alkyltrimethylammonium bromide. It is also possible to use trialkylamines having one relatively long ($\geq$5 carbon atoms) and two relatively short hydrocarbon radicals (<5 carbon atoms), these being present in protonated form during the course of the acetalization, which proceeds under strongly acidic conditions, and being capable of acting as emulsifier. The amount of emulsifier is from 0.01 to 20% by weight, based on the total weight of the polyvinyl acetal in the original solution. Preference is given to amounts of from 0.01 to 2% by weight of emulsifier, and a particularly preferred amount of emulsifier is from 0.01 to 1% by weight, based on the polyvinyl acetal.

The polyvinyl acetals have a degree of acetalization of from 1 to 80 mol %, preferably from 45 to 80 mol %. The viscosity of the polyvinyl acetals (DIN 53015; Höppler method, 10% by weight solution in ethanol) is preferably from 2 to 10 mPas, particularly preferably from 3 to 8 mPas. The degree of polymerization $P_w$ is less than 200, preferably less than 175, more particularly preferably less than 150. The most preferred polyvinyl acetals have a degree of acetalization of from 45 to 80 mol % and a viscosity (DIN 53015, Höppler method; 10% by weight solution in ethanol) of from 2 to 10 mPas.

The procedure of the invention gives access to low molecular weight polyvinyl acetals which have markedly better adhesion to critical substrates, than previously employed polyvinyl acetals making it virtually or completely unnecessary to add coupling agents.

As mentioned at the outset, there is a particular requirement in the printing ink industry for binders with very good adhesion to various flexible polymeric films, for providing printing inks which once applied have very firm bonding to the substrate and are therefore very difficult to remove from the printed substrate. The excellent adhesion of the low molecular weight polyvinyl acetals, in particular polyvinyl butyrals or mixed polyvinyl acetals, make these polymers particularly suitable for use in printing ink formulations.

Suitable printing ink formulations are known to the skilled worker and generally comprise from 5 to 20% by weight of pigments, such as diazo pigments or phthalocyanine pigments, from 5 to 15% by weight of polyvinyl acetal binder, and solvent, for example alcohol solvents such as ethanol, or ester solvents such as ethyl acetate. Where appropriate, other additives may also be present, such as inhibitors, plasticizers, and other added materials, such as fillers or waxes. It is no longer essential to use coupling agents.

The low molecular weight polyvinyl acetals are also highly suitable as additives for laminated safety glass and glass composites, and high-performance safety glass and glazing films, since it is possible to achieve higher tensile stress at break as well as a further improvement in adhesion to glass.

Water-soluble, partially acetalized low molecular weight polyvinyl acetals which may also contain ionic groups, such as carboxylate groups or sulfonate groups, are also useful as protective colloids, for example for aqueous dispersions, during polymerization in an aqueous medium, or during the production of water-redispersible dispersion powders. Preference in such applications is given to water-soluble polyvinyl acetals, for example those having a (solubility of more than 10 g/l in water under standard conditions of temperature and pressure, and having a degree of acetalization of 1 to 20 mol %, more preferably from 3 to 16 mol %.

The low molecular weight polyvinyl acetals may also be used in water-based paints. Other application sectors for the low molecular weight polyvinyl acetals are their use as a binder in anti-corrosion compositions, where increased adhesion is an advantage. The polyvinyl acetals are also suitable as binders in the ceramics industry, specifically as binders for green ceramics. Mention should also be made of their use as binders for ceramic powders or metal powders in injection molding (powder injection molding), or as binders for the internal coating of containers. In all cases, the low molecular weight polyvinyl acetals exhibit considerably better adhesion than the polyvinyl acetals known from the prior art.

The examples below provide further illustration of the invention but do not limit its scope in any way.

EXAMPLE 1

2,775 ml distilled water, 1,143 ml of 20% by weight HCl and 1,110 ml of a 20.9% by weight aqueous solution of a polyvinyl alcohol of hydrolysis number (HN) 20.3 mg KOH/g, viscosity 2.02 mPas (DIN 53015; Höppler method; 4% by weight aqueous solution), K value 25.2, were charged to a 6 liter glass reactor, and cooled to –7° C. over a period of one hour, with stirring. 175 ml of butyraldehyde, cooled in advance to –4° C., were then added over a period of 5 minutes, with an attendant rise in the internal temperature to –5° C. within a short period. Between approximately 5 and 7 minutes after addition of the butyraldehyde, the mixture, which was initially clear, became milky, and the product precipitated after as little as 10 minutes. After 40 minutes of reaction time at –7° C., the temperature was increased to 25° C. over a period of 3.5 hours, this temperature maintained for a further 2 hours. The product was then separated by suction filtration and washed with distilled water until the filtrate gave a neutral reaction. This was followed by drying to a solids content of at least 98%, initially at 22° C. and then at 35° C. in vacuo, yielding a low molecular weight polyvinyl butyral having 17.5% by weight of vinyl alcohol units. The vinyl acetate content was less than 2% by weight. The viscosity (DIN 53015; Höppler method; 10% by weight ethanolic solution) was 5.48 mPas and the $P_w$ was less than 175.

EXAMPLE 2

2,700 ml of distilled water, 600 ml of a 20% by weight HCl and 1,400 ml of a 17.0% by weight aqueous solution of a polyvinyl alcohol, HN 44.2 mg KOH/g, viscosity 1.92 mPas (DIN 53015; Höppler method; 4% by weight aqueous solution were charged to a 6 liter glass reactor and cooled to +3° C. over a period of one hour, with stirring. 120 ml of acetaldehyde, cooled in advance to −4° C., were then added over a period of 5 minutes, with an attendant rise in the internal reactor temperature to +5° C. The mixture was cooled again to +3° C. within a very short period and stirred for 20 minutes at this temperature. 150 ml of butyraldehyde, cooled in advance to −4° C., were then added over the same period of 5 minutes, with an attendant short-term rise in the internal temperature to 4.5° C. From 6 to 8 minutes after addition of the butyraldehyde, the mixture, which was initially clear, became cloudy, and the product precipitated after as little as 10 minutes. After 40 minutes of reaction time at +3° C., the temperature was increased to 25° C. over a period of 3.5 hours, and this temperature maintained for a further 2 hours. The product was then separated by suction filtration and washed with distilled water until the filtrate gave a neutral reaction. This was followed by drying to a solids content of at least 98%, initially at 22° C. and then at 35° C. in vacuo, yielding a low molecular weight polyvinyl acetal having 13.2% by weight of vinyl alcohol units. The vinyl acetate content was 3.7% by weight. The viscosity (DIN 53015; Höppler method; 10% by weight ethanolic solution) was 5.02 mPas and the $P_w$ was less than 175.

EXAMPLE 3

2,590 ml of distilled water, 1,114 ml of 20% by weight HCl and 1,250 ml of a 19.1% by weight aqueous solution of a polyvinyl alcohol, HN 78.1 mg KOH/g, viscosity 1.84 mPas (DIN 53015; Höppler method; 4% by weight aqueous solution) prepared by hydrolyzing an acid-functionalized solid PVac resin with 0.2% by weight of acrylic acid (based on total weight of polymer), were charged to a 6 liter glass reactor and cooled to −5° C. over a period of one hour, with stirring. 180 ml of butyraldehyde, cooled in advance to −4° C., were added within a period of 5 minutes, with an attendant rise in internal reactor temperature to −3.5° C. The mixture was then cooled again to −5° C. within a very short period. 4 minutes after addition of the butyraldehyde the mixture, which had until then been clear, became cloudy, and the product precipitated after as little as 6 minutes. After 40 minutes reaction time at −5° C. the temperature was increased to 25° C. over a period of 3.5 hours, and this temperature was maintained for a further 2 hours. The product was then separated by suction filtration and washed with distilled water until the filtrate gave a neutral reaction. This was followed by drying to a solids content of at least 98%, initially at 22° C. and then at 35° C. in vacuo, yielding a low molecular weight polyvinyl butyral having 16.9% by weight of vinyl alcohol units. The vinyl acetate content was 6.3% by weight. The viscosity (DIN 53015; Höppler method; 10% by weight ethanolic solution) was 4.83 mPas and $P_w$ was less than 175.

Comparative Example C1

The procedure of Example 1 was followed, except that the polyvinyl alcohol charged for the acetalization comprised a 20% by weight aqueous solution of a fully hydrolyzed vinyl acetate homopolymer having a residual content of 2% by weight of vinyl acetate units and viscosity (DIN 53015; Höppler method; 4% by weight aqueous solution) of 3.5 mPas. The acetalization was carried out using 190 ml of butyraldehyde. The product was a polyvinyl butyral having 17.9% by weight of vinyl alcohol units, and 2.0% by weight of vinyl acetate units. The viscosity (DIN 53015; Höppler method; 10% by weight ethanolic solution) was 26.9 mPas and $P_w$ was greater than 200.

Comparative Example C2

The procedure of Example 2 was followed, except that the polyvinyl alcohol charged for the acetalization comprised a 20% by weight aqueous solution of a fully hydrolyzed vinyl acetate homopolymer with a residual content of 2% by weight of vinyl acetate units and with a viscosity (DIN 53015; Höppler method; 4% by weight aqueous solution) of 3.2 mPas. The acetalization was carried out using 100 ml of acetaldehyde and 128 ml of butyraldehyde. The product was a polyvinyl acetal having 15.8% by weight of vinyl alcohol units. The viscosity (DIN 53015; Höppler method; 10% by weight ethanolic solution) was 25.8 mPas and $P_w$ was greater than 200.

Test Methods

1. Determination of Dynamic Viscosity of a Solution of Polyvinyl Acetals (Solution Viscosity)

90.00±0.01 g of ethanol and 10.00±0.01 g of polyvinyl acetal were weighed into a 250 ml Erlenmeyer flask with ground glass stopper and fully dissolved in a shaker at 50° C., followed by cooling to 20° C. and determination of dynamic viscosity (DIN 53015; Höppler method) at 20° C. using a suitable ball, e.g. ball 2 or 3.

2. Determination of Vinyl Alcohol Content

The content of vinyl alcohol groups in the polyvinyl acetals was determined by acetylating the hydroxyl groups with acetic anhydride in the presence of pyridine and 4-dimethylaminopyridine.

For this, 1±0.001 g of polyvinyl acetal was dissolved in 24 ml of pyridine and 0.04 g of 4-dimethylaminopyridine at 50° C. over a period of 2 hours. The solution, cooled to 25° C., was treated with 10 ml of a mixture made from pyridine and acetic anhydride (87/13 parts by volume) and intimately mixed for a period of 1 hour. 30 ml of a mixture made from pyridine/water (5/1 parts by volume) were then added and the reaction mixture was shaken for a further hour. This was followed by titration to pH 7 using methanolic 0.5 N KOH. Calculation:

% by weight of vinyl alcohol=[(100×$M_w$)/2000]×(ml blind value−ml specimen), where $M_w$=average molecular weight per repeat unit in the polymer.

3. Determination of Viscosity of Polyvinyl Alcohol Solutions

The method for determining the viscosity of the partially or fully hydrolyzed solid polymers used as starting materials was based on the determination of dynamic viscosity of the polyvinyl acetals; the aqueous solutions used were of only 4% by weight.

4. Determination of Adhesion a) Tesa Test

A blister-free film is cast from the specimen to be tested (e.g. polyvinyl acetal) on a film (in some cases cleaned in advance using isopropanol and, where appropriate, corona-pretreated), and dried. For casting of the film, the polyvinyl acetal is dissolved in ethanol, the concentration in each case depending on the viscosity of the solution. Beiersdorf AG Tesa 4105 film of width 15 mm is used for the test. To test bond by weight, a strip of length 13 cm is applied by adhesion to the dried film which has been stored at room temperature for at least 16 h. Firm and uniform pressure from a fingernail is used to secure the applied section, while pulling one end of the Tesa film to obtain a lug for peeling. The film to be tested should have been located on a hard underlay for this process. The lug is now used to peel off the Tesa film backward at an angle of 45°. The test consists in observing the area under investigation to find whether and to what extent the film has adhered to the Tesa film and become released from the printed material. The test is carried out on a number of areas, under identical conditions. The results are graded 1 to 4, 1 being the best grade and 4 the worst.

Detailed Assessment

1=very good adhesion (no areas of release)
2=release of the coating in isolated areas
3=release of the coating at a number of areas
4=coating does not adhere (full release)

b) Determination of Adhesion in Composite

The adhesion of a paint or of a printing ink to the underlying material can be expressed numerically by using an instrument to measure the bond by weight in the laminate. For this test, each type of film was laminated to itself. If the films were corona-pretreated prior to application of the paint, the laminate film was subjected to the same pretreatment. The laminates were produced using a laminating roll with a weight of 5 kg, and the adhesive used was a 2c PU system (Liofol UK 3640, hardener UK 6800) from Henkel. This system is suitable for producing composite films from PE, PP, PET, PA, or UPVC. To produce a ready-to-use adhesive, the first adhesive component is diluted to 35% and then mixed with the hardener in a ratio of 50:1. This adhesive is applied to the film, dried for 30 s at room temperature, and laminated to the painted side (coating as in Tesa test) of another film, by passing the roller 6 times over the composite, without applying pressure. The adhesive is cured at a temperature of 60° C. for 24 h. The composite is cut into strips of width 15 mm, and bond by weight is measured on tensile testing equipment from Instron. The higher the value measured, the better the adhesion in the composite. If the adhesion in the composite is very good, it is even possible for the film to tear, in which case no quantitative value is given.

Results of Application-related Tests

To test adhesion, the Tesa test and the determination of adhesion in the composite were carried out using the following commercially available films:

DuPont PET Melinex 800; corona pretreatment using 400 W
DuPont PET Melinex 813; untreated
OPP Mobil MB 400; untreated; (polypropylene film)
OPP Mobil MB 400; corona pretreatment using 600 W, (polypropylene film)

Results from measurements of adhesion of products from examples and comparative examples (Table 1):

TABLE 1

GRADING FROM TESA TEST

| Example | Corona t. PET 800 | Untreated PET 813 | Untreated OPP 400 | Corona t. OPP 400 |
|---|---|---|---|---|
| 1 | 1 | 1 | 3 | 2 |
| 2 | 1 | 1 | 1 | 1 |
| 3 | 1 | 1 | 1 | 1 |
| C1 | 1 | 1 | 4 | 4 |
| C2 | 1 | 1 | 4 | 4 |

In the Tesa test, when the low molecular weight polyvinyl acetals are used a marked improvement in adhesion is obtained, especially for the polypropylene films (OPP Mobil MB 400, treated and untreated). This is confirmed by comparing Examples 1 and 3 with Comparative Example C1 and comparing Example 2 with Comparative Example C2.

In the case of the DuPont PET Melinex polyester films the Tesa test does not give clear conclusions, since even the comparative samples here (standard product) exhibit very good adhesion from the outset.

Determination of adhesion in the composite, as seen in Table 2, makes the differences clearer.

TABLE 2

DETERMINATION OF
ADHESION IN COMPOSITE; UNIT: N/15 MM

| Example | Corona t. PET 800 | Untreated PET 813 | Untreated OPP 400 | Corona t. OPP 400 |
|---|---|---|---|---|
| 1 | 0.35 | 0.45 | 0.55 | 0.63 |
| 2 | 0.75 | 0.72 | 0.95 | 1.21 |
| 3 | 0.46 tF | F | 0.69 | 0.72 tF |
| C1 | 0.03 | 0.09 | 0.02 | 0.01 |
| C2 | 0.09 | 0.15 | 0.05 | 0.11 | tF = some tearing of film; F = film tears

Use of the low molecular weight polyvinyl acetals of the invention markedly increased adhesion in the composite with all of the films tested. This is confirmed by comparing Example 1 with Comparative Example C1. The effect becomes even more marked when carboxy groups are introduced into the low molecular weight polyvinyl acetal, as demonstrated by comparing Example 3 with Comparative Example C1. Here, in the case of polyester films (DuPont PET Melinex 800 and 813) and in the case of Mobil MB 400 OPP polypropylene film (corona treated), the increase in adhesion in the composite was indeed so great that there is some degree of, or complete, tearing of the film.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A low molecular weight polyvinyl acetal with a solution viscosity of from 2 to 12 mPas measured in accordance with DIN 53015, Höppler method, 10% by weight solution in ethanol, and with a degree of polymerization $P_w$ less than 200, said low molecular weight polyvinyl acetal obtained by hydrolyzing a vinyl ester polymer and then acetalizing the resultant polyvinyl alcohol using one or more aldehydes selected from the group consisting of aliphatic and aromatic aldehydes having from 1 to 15 carbon atoms, wherein a vinyl ester polymer obtained by polymerizing one or more vinyl esters of optionally branched $C_{1-15}$ alkylcarboxylic acids, and optionally, one or more co-monomers selected from the group consisting of ethylenically unsaturated mono- and dicarboxylic acids, ethylenically unsaturated carboxamides and carbonitriles, monoesters of fumaric acid and maleic acid and salts thereof, (meth)acrylates of $C_{1-15}$ alcohols, monoolefins, dienes, vinylaromatics and vinyl halides, and optionally, from 0.02 to 20% by weight based on the weight of the vinyl ester polymer of one or more polyethylenically unsaturated pre-crosslinking monomers, and from 0.02 to 20% by weight of one or more post-crosslinking monomers selected from the group consisting of acrylamidoglycolic acid, methyl methacrylamidoglycolate, N-methylolacrylamide, N-methylolmethacrylamide, allyl N-methylolcarbamate, alkyl ethers and esters of N-methylolacrylamide, alkyl ethers and esters of N-methylolmethacrylamide and alkyl ethers and esters of allyl N-methylolcarbamate, said vinyl ester polymer having a solution viscosity of from 1.0 to 1.6 mPas measured in accordance with DIN 53015, Höppler method, 10% by weight solution in ethyl acetate, is hydrolyzed, the hydrolysis proceeds until the content of vinyl alcohol units is $\geq 50$ mol %, and the resulting polyvinyl alcohol has a solution viscosity is from 1.0 to 2.0 mPas measured in accordance with DIN 53015, Höppler method, 4% by weight solution in water.

2. The low molecular weight polyvinyl acetal of claim 1, wherein the vinyl ester polymer contains from 50 to 99.98% by weight of vinyl ester derived moieties, based on the total weight of the polymer.

3. The low molecular weight polyvinyl acetal of claim 1, wherein the vinyl ester polymer further comprises one or more units derived from methacrylic esters of $C_{1-15}$ alcohols acrylic esters of $C_{1-15}$ alcohols, monoolefins, dienes, vinylaromatic, or vinyl halides, wherein the vinyl ester content of the vinyl ester polymer is $\geq 50$ mol %.

4. The low molecular weight polyvinyl acetal of claim 1, wherein the vinyl ester polymer further comprises 0.02 to 20% by weight, based on the total weight of vinyl ester polymer, of one or more units derived from ethylenically unsaturated mono- or dicarboxylic acids, ethylenically unsaturated carboxamides, ethylenically unsaturated carbonitriles, monoesters of fumaric acid or monoesters of and maleic acid.

5. The low molecular weight polyvinyl acetal of claim 1, wherein acetalizing is performed with butyraldehyde, optionally in admixture with acetaldehyde.

6. The low molecular weight polyvinyl acetal of claim 1, wherein the degree of acetalization is from 1 to 80 mol %, the degree of polymerization $P_w$ is less than 175, and the viscosity of the polyvinyl acetal solution is from 2 to 10 mPas.

7. In a composition employing a polymeric binder, the improvement comprising selecting as at least a portion of said binder, the low molecular weight polyvinyl acetal of claim 1.

8. The composition of claim 7 which is a printing ink.

9. The printing ink of claim 8, comprising from 5 to 20 weight percent of pigment, from 5 to 15 weight percent low molecular weight polyvinyl acetal, and at least one solvent, said weight percents based on the total weight of said printing ink.

10. The composition of claim 7 which is a water-based paint.

11. The composition of claim 7 which is a powder coating.

12. The composition of claim 7 which is an anti-corrosion composition.

13. The composition of claim 7 which is a binder-containing ceramic powder or binder-containing metal powder composition.

14. The composition of claim 7 which is an internal container coating.

15. In an aqueous dispersion, an aqueous polymerization, or a redispersible polymer powder preparation wherein a protective colloid is employed, the improvement comprising selecting as at least one protective colloid the low molecular weight polyvinyl acetal of claim 1.

16. In laminated safety glass, glass composites, or glazing films wherein a polymer film or adhesive is employed, the improvement comprising incorporating as at least a portion of said polymer film or adhesive, the low molecular weight polyvinyl acetal of claim 1.

17. The low molecular weight polyvinyl acetal of claim 1, wherein said vinyl ester polymer consists of a polyvinylacetate polymer or a polyvinylacetate copolymer containing copolymerized vinyl acetate moieties and copolymerized moieties derived from one or more comonomers selected from the group consisting of ethylenically unsaturated monocarboxylic acids, ethylenically unsaturated dicarboxylic acids, ethylenically unsaturated carboxamides, ethylenically unsaturated carbonitriles, fumaric acid monoesters, and maleic acid monoesters.

18. The low molecular weight polyvinyl acetate of claim 1, wherein said vinyl ester polymer is homopolymeric polyvinylacetate.

19. The low molecular weight polyvinyl acetate of claim 1, wherein said vinyl ester polymer consists of a copolymer of vinyl acetate and at least one monomer selected from the group consisting of acrylic acid and methacrylic acid.

20. The low molecular weight polyvinyl acetal of claim 1, wherein said polyvinyl alcohol has a solution viscosity of from 1.0 to 1.8 mPa·s.

* * * * *